United States Patent [19]

Miura et al.

[11] Patent Number: 4,691,246

[45] Date of Patent: Sep. 1, 1987

[54] APPARATUS FOR MULTIPLEX RECORDING AND REPRODUCTION OF AUDIO AND VIDEO SIGNALS

[75] Inventors: Kuniaki Miura, Naka; Yoshinori Okada, Katsuta; Isao Fukushima, Katsuta; Susumu Otsuka, Katsuta, all of Japan

[73] Assignee: Hitachi, Ltd., Tokyo, Japan

[21] Appl. No.: 677,243

[22] Filed: Dec. 3, 1984

[30] Foreign Application Priority Data

Dec. 2, 1983 [JP] Japan ................................ 58-226878

[51] Int. Cl.$^4$ ............................................ H04N 5/782
[52] U.S. Cl. .................... 358/310; 358/343; 360/19.1
[58] Field of Search ............... 358/310, 327, 328, 330, 358/341, 343; 360/19.1

[56] References Cited

U.S. PATENT DOCUMENTS

| 4,490,753 | 12/1984 | Ito et al. | 360/19.1 |
| 4,607,293 | 8/1986 | Okada et al. | 358/343 X |
| 4,622,597 | 11/1986 | Hirota et al. | 358/343 |

*Primary Examiner*—Robert L. Richardson
*Attorney, Agent, or Firm*—Antonelli, Terry & Wands

[57] ABSTRACT

A recording circuit for a video tape recorder which records superposedly a frequency-modulated audio signal with a frequency-modulated luminance signal and a carrier color signal converted to a low frequency band records a carrier wave signal which is frequency-modulated by the luminance signal at a substantially constant recording current within the frequency range corresponding to a range from the sync signal leading edge to the white peak. In an ordinary recording circuit, the extent of erasure of the recorded audio signal varies with the content of the frequency-modulated luminance signal when the luminance signal is recorded on the recording track of the frequency-modulated audio signal, because recording is made by increasing a recording current for a signal having an instantaneous frequency which is low. Therefore, the recorded signal which is frequency-modulated by the audio signal is amplitude-modulated by the luminance signal, and interference with the audio signal due to the change of S/N corresponding to the change of the amplitude occurs. In the recording circuit of the present invention, however, no interference is applied to the audio signal because the extent of erasure of the recorded audio signal by the luminance signal remains substantially constant irrespective of the content of the luminance signal.

4 Claims, 9 Drawing Figures

(a)

(b)

4,691,246

APPARATUS FOR MULTIPLEX RECORDING AND REPRODUCTION OF AUDIO AND VIDEO SIGNALS

BACKGROUND OF THE INVENTION

This invention relates to an apparatus for multiplex recording and reproduction of audio and video signals, and more particularly to a recording apparatus suitable for multiplex recording of audio signals and color video signals by use of a magnetic recording/reproduction apparatus such as video tape recorder.

In video tape recorders in general, a video signal is recorded by a rotary head so as to form an oblique track on a magnetic tape, while an audio signal is recorded by a fixed head on a track disposed in the longitudinal direction of the tape at a portion separate from the oblique track (generally, at the edge portion of the tape), as is well known in the art. In a home video tape recorder, a slow running speed is selected for the magnetic tape in order to increase the recording density and to facilitate long time recording. In an NTSC video tape recorder, for example, the tape running speed is prescribed to be about 33 mm/sec in the standard mode and about 11 mm/sec in the triple recording mode. This tape running speed is lower than the tape running speed of an audio tape recorder using a compact cassette. For this reason, the video tape recorder can not provide a sufficiently satisfactory frequency range for the recording and reproduction of audio signals for which the tone quality is of particular importance, particularly in the triple recording mode.

A method of recording and reproducing audio signals by use of a rotary head in the same way as video signals has therefore been proposed to eliminate the problem described above. In the home video tape recorder, the color television signal is recorded by a common rotary head on the magnetic tape as an addition signal of a signal obtained by frequency-modulating a suitable carrier by a luminance signal and a carrier color signal which is down-converted below the band of the frequency-modulated carrier signal described above. Recording of the audio signal in accordance with this proposal is made in a superposed manner by the rotary head on the same recording track with the video signal as a frequency-modulated signal with its band set between the band of the luminance signal generated as the frequency-modulated signal and the band of the carrier color signal converted to a low frequency band. As one of the means for the multiplex recording of the audio and video signals, it has been proposed to use rotary heads that are individually disposed for the audio and video signals in such an arrangement that these heads can trace the same track on the magnetic tape. In this case, the frequency-modulated audio signal of the low frequency band is first recorded, and the frequency-modulated luminance signal having a high frequency is then recorded. According to this method, the signal having a low frequency magnetizes the deep portion of the magnetic layer of the magnetic tape, whereas the signal of a high frequency magnetizes only the shallow portion of the magnetic layer of the tape. Therefore, the shallow portion of the recording magnetization by the audio signals having the low frequency (in the form of the frequency-modulated signal, of course) will be erased by the subsequent recording of the frequency-modulated luminance signals, but the deep portion remains unerased. As a result, two kind of signals can be recorded superposed on one track at the deep portion of the magnetic layer and at its shallow portion close to the surface.

This multiplex recording method of the video and audio signals is effective where no margin for multiplexing them as a frequency multiplex signal exists between the frequency band of the frequency-modulated luminance signal and that of the carrier color signal converted to the low frequency band. When the color video signal is recorded in the VHS system video tape recorder, for example, it is stipulated to convert the color video signal so as to attain the frequency spectrum such as shown in FIG. 1. In the case of the luminance signal of the NTSC signal, the carrier signal is frequency-modulated so that the leading edge of a sync signal is 3.4 MHz and the white peak level if 4.4. MHz, and a frequency distribution such as represented by reference numeral 4 is provided. In the case of the carrier color signal, the carrier frequency is converted to about 629 KHz, and a frequency distribution having a band width of about 1 MHz, such as represented by reference numeral 5 in the drawing, is provided. Thus, there is no margin between the distribution 4 of the luminance signal and that of the carrier color signal. For the spectrum of the video signals for recording, the audio signal converted to the frequency-modulated signal is set within the frequency range represented by reference numeral 6 in the drawing, and is recorded and reproduced by the separate rotary head.

Some of the inventors of the present invention previously proposed an apparatus for superposedly recording the audio signal on the track of the video signal in U.S. patent application Ser. No. 575,665 dated Jan. 31, 1984. The previous application proposes the arrangement of each head in order to minimize the interference due to cross talk from the adjacent tracks and the interference between the video signal and the audio signal.

In the home video tape recorders in general, the optimum recording current at which the reproduction output becomes maxium within a practically suitable range tends to decrease with a higher signal frequency. Therefore, predetermined frequency characteristics are set to a recording amplifier. In the VHS system, for example, the characteristics are set so that a 1 MHz recording current is about 6 dB when the recording current of a 3.4 MHz signal is 0 dB.

Therefore, the carrier corresponding to the leading edge of the sync signal becomes greater than the carrier corresponding to the white peak in the recording current of the video signal. As a result, the frequency-modulated audio signal, that has been recorded before the video signal, is not uniformly erased by recording of the subsequent frequency-modulated luminance signal when the former is somewhat erased by the latter, so that the extent of the erasure varies depending upon the content of the video signal. In other words, the extent of the erasure becomes maxium at the sync signal and minimum at the white peak. Therefore, if the luminance signal of the video signal, such as shown in FIG. 2a, is recorded, the amplitude of the reproduction output of the frequency-modulated audio signal is amplitude-modulated corresponding thereto, as shown in FIG. 2b. FIG. 2b shows the envelope of the reproduction output of the signal which is frequency-modulated by the audio signal, and the amplitude is lowest at the portion 20 corresponding to the sync signal and greatest at the portion 21 corresponding to the white peak. Thus, though frequency-modulated, the origial audio signal can be obtained by demodulation because it is fundamentally a frequency-modulated signal. The influence of the amplitude modulation generated by the erasing action of the recording of the luminance signal is not so great as to cause distortion in the demodulated signal waveform. In the case of the reproduction signal shown in FIG. 2b, however, the carrier-to-noise ratio C/N of the portion 20 corresponding to the sync signal is deteriorated more than the C/N of the portion 21 corresponding to the white peak. (Since the audio signal in this case is one obtained by frequency-modulating the carrier, the ratio C/N is used so as to distinguish it from the signal-to-noise ratio S/N.) As a result, when this signal is demodulated, the noise of the portion corresponding to the portion 20 relatively increases much more than that of the portion 21 and eventually, the S/N of the portion 20 becomes worse than that of the portion 21. This means that in the demodulated audio signal, noise increases periodically in synchronism with the sync signal of the video signal. Particularly, the increase of the noise, that appears in synchronism with the vertical sync signal, is very noticable to the listener and is unpleasant to the ear, even though it is not great, because the fundamental repeating frequency is as low as 60 Hz, for example, and because it is the noise that did not exist originally.

SUMMARY OF THE INVENTION

It is therefore an object of the present invention to provide a recording apparatus which eliminates the problem described above, and prevents the frequency-modulated audio signal that is to be recorded superposedly on the same track as the video signal from being amplitude-modulated by the video signal.

In order to accomplish the object described above, the present invention operates to make a recording current at a sync signal portion equal to that of a white peak portion and to make the recording current constant in a recording system of a frequency-modulated luminance signal. This can be realized, for example, by inserting a trap circuit which traps a signal close to the frequency corresponding to the instantaneous frequency of the carrier modulated by the sync signal, in a recording circuit including an amplification circuit which amplifies and applies a modulated carrier signal to a magnetic head.

DESCRIPTION OF THE PREFERRED EMBODIMENTS

Figure 3:
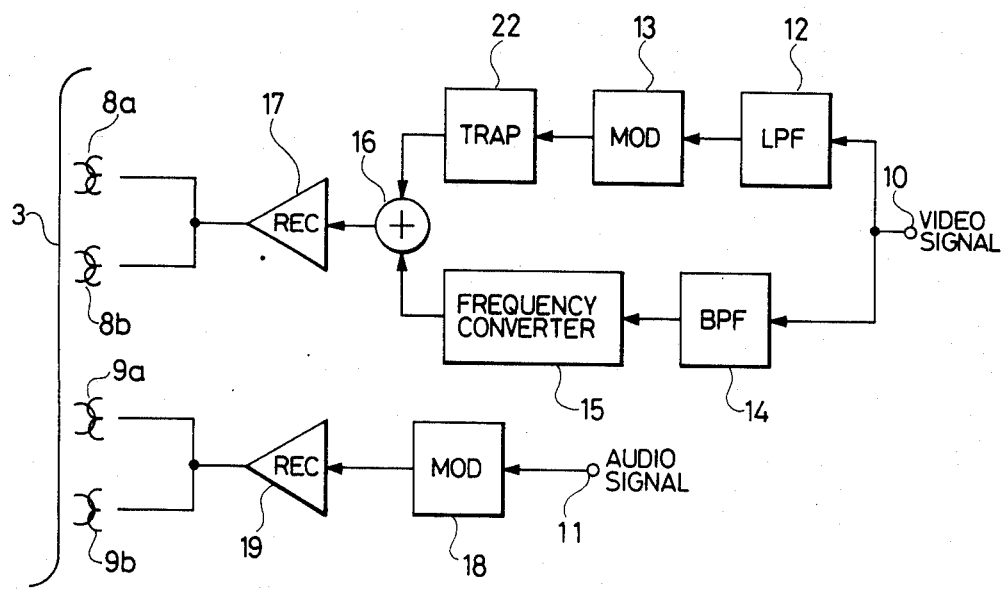
FIG. 3 is a block diagram showing an example of the recording circuit in accordance with the present invention.

FIG. 3 is a block diagram of one embodiment of the present invention, and shows the principal portions of a recording circuit. A reproduction circuit is not shown in the drawing. A color video signal applied to a terminal 10 is filtered by a low-pass filter (LPF) 12 to extract a luminance signal, while a band-pass filter (BPF) 14 extracts a carrier color signal. The extracted luminance signal is applied to a modulator 13 for frequency-modulating a suitable carrier. In the VHS system for recording and reproducing the NTSC signal, for example, modulation is effected so that the carrier frequency is 3.4 MHz at the leading edge of the sync signal and is 4.4 MHz at the white peak. The carrier frequency of the extracted carrier color signal in the VHS system is down-converted from 3.5 MHz to about 629 KHz by a frequency conversion circuit 15. The frequency-modulated luminance signal and the down-converted carrier color signal have the frequency spectra such as shown already in FIG. 1. Conventionally, they are added and are then recorded through a recording amplifier. In accordance with the first embodiment of the present invention, however, these two signals are not directly added as shown in FIG. 3, but a carrier color signal converted to a low frequency range is added by an adder 16 to a frequency-modulated luminance signal which has passed through a trap circuit 22 disposed in the path of the frequency-modulated luminance signal. After being added, these signals are amplified to a predetermined magnitude by the recording amplifier 17, are applied to two rotary magnetic heads 8a and 8b, and are thereafter recorded on the magnetic tape 3. This embodiment shows an example when the invention is applied to a video tape recorder of a two-head helical scan system.

Figure 1:
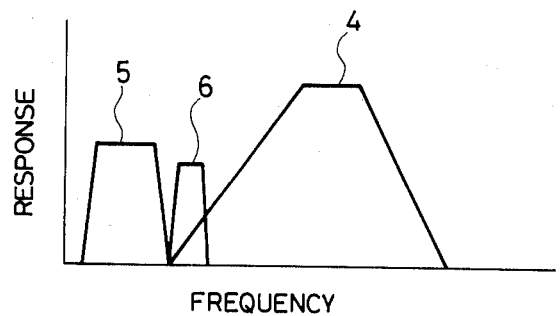
FIG. 1 shows the frequency spectrum of each signal in a video tape recorder for recording in a superimposed manner an audio signal on the same recording track as a color video signal.

The audio signal that is to be superimposed on the recording track of the video signal that has been recorded in the manner described above is applied to a terminal 11. This audio signal is applied to a modulator 18 having a carrier frequency different from that of the modulator 13 for the luminance signal. This modulator 18 generates a frequency-modulated audio signal having a frequency band 6 above the band of the carrier color signal 5 converted to a low frequency range at the low frequency portion of the frequency-modulated luminance signal as shown in FIG. 1. If the audio signals applied to the terminal 11 are stereo audio signals, 1.3 MHz and 1.7 MHz, for example, are set as the center frequency of the carriers for the right and left channel signals. This frequency-modulated audio signal is applied to the two rotary magnetic heads 9a and 9b through the recording amplifier 19, and is then recorded on the magnetic tape 3 with the video signal.

Figure 4:
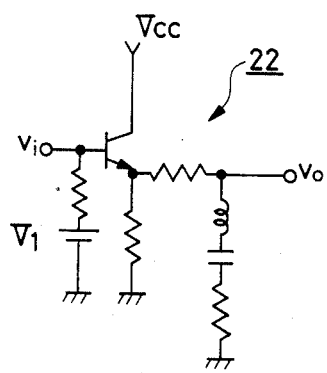
FIG. 4 is a circuit diagram showing a definite example of a trap circuit to be used for the circuit shown in FIG. 3.
Figure 5:
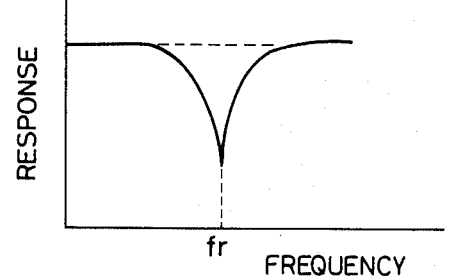
FIG. 5 is a diagram showing the frequency characteristics of the trap circuit 22.

FIG. 4 shows a definite example of the trap circuit 22. FIG. 5 shows an example of the frequency characteristics of this circuit. The trap circuit 22 comprises the combination of an LC series resonance circuit with a transistor using the former as the emitter follower. An ordinary trap circuit can be used as the trap circuit 22.

Is is most optimal to set the trap frequency within the range of from 2.7 to 3.5 MHz for the VHS system of NTSC. The overall frequency characteristics of the recording current of the frequency-modulated luminance signal are such as represented by solid line in FIG. 6, for example, when this trap circuit is used. In this manner, it is possible to make constant the recording signal current within the frequency range corresponding the range of the leading edge (3.4 MHz) of the sync signal of the frequency-modulated luminance signal to the white peak (4.4 MHz). In the drawing, the two-dot chain line represents the frequency characteristics of the conventional recording signal current. Since pre-emphasis is applied, the instantaneous carrier frequency of the frequency-modulated luminance signal is primarily distributed within the range of from 3 to 5 MHz; hence, the energy within this range accounts for the major proportion. It is therefore preferred to have the signal current within this range as constant as possible in order to prevent any interference to the frequency-modulated audio signal that is superposedly recorded.

If the signal current of 3 to 5 MHz is made substantially constant in the manner described above, the frequency characteristics deviate somewhat from the characteristics of the conventional, optimum recording current (shown by the two-dot chain line in FIG. 6) that are set so as to obtain the highest reproduction output level. However, the change of the reproduction output level with the change in the quantity of the recording current is not very critical, and an error of from about ±1 to about ±1.5 dB from the center value is pemissible without any problem at all when setting the current value. Therefore, when the present invention is practised, deterioration of picture quality due to the drop of the reproduction output of the video signal does not occur.

Figure 2:
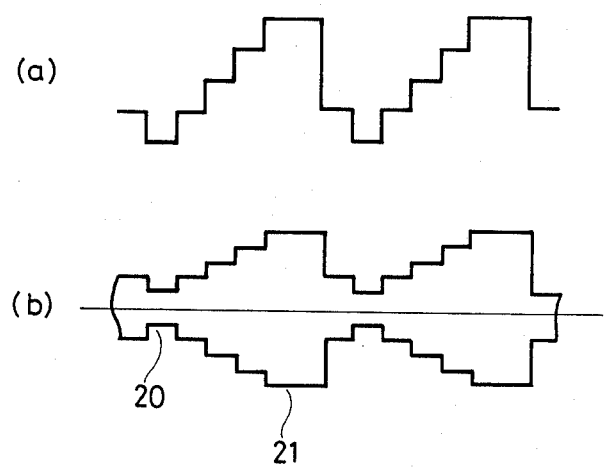
FIG. 2 shows at (a) and (b) examples of the waveform of a luminance signal and the waveform of a frequency-modulated audio signal which is amplitude-modulated by superimposed recording of a video signal, respectively.
Figure 7:
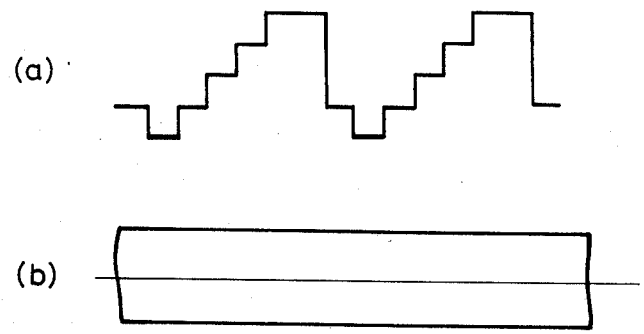
FIG. 7 shows at (a) and (b) examples of the waveform of the reproduction signal of the frequency-modulated audio signal, which is recorded superposedly with the video signal in accordance with the present invention, together with the waveform of the video signal.

FIG. 7 shows the reproduction output envelope of the frequency-modulated audio signal and the waveform of the video signal when the video signal and the audio signal are recorded so as to be superimposed in accordance with the embodiment of the invention. FIG. 7a shows the waveform of the video signal and FIG. 7b is the envelope waveform of the frequency-modulated audio signal in the same way as in FIG. 2. As shown in the drawing, the reproduced frequency-modulated audio signal is not amplitude-modulated by the video signal because there is no difference in the extent of erasure due to the signal content of the frequency-modulated luminance signal of the video signal. Therefore, the problem of the carrier-to-noise ratio (C/N) of the audio signal periodically deteriorating at the sync signal portion can be eliminated, and recording and reproduction of excellent tone quality can be obtained.

The carrier color signal converted to a low frequency range that is simultaneously recorded with the frequency-modulated luminance signal is set to a level lower by 10 to 12 dB than the current of the frequency-modulated luminance signal and is recorded. Therefore, it is substantially possible to neglect the amplitude-modulation of the frequency-modulated audio signal, that has been recorded previously, by the carrier color signal, and there is no problem with the effect of the color signal.

Figure 6:
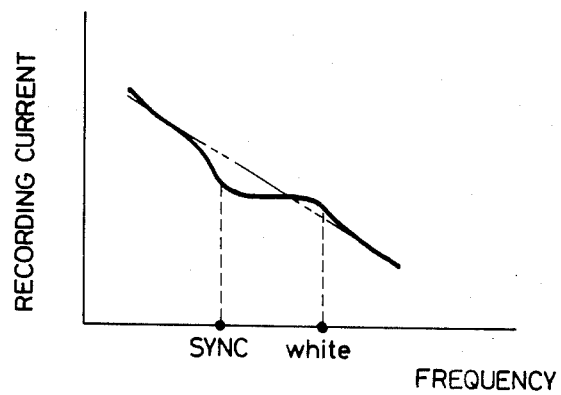
FIG. 6 is a diagram showing an example of the frequency characteristics of the recording current of a frequency-modulated luminance signal in accordance with one embodiment of the present invention.

In the embodiment shown in FIG. 3, the trap circuit 22 is shown disposed before the adder 16, but this position is not particularly critical so long as the frequency characteristics of the current of the frequency-modulated luminance signal to be recorded eventually become those shown in FIG. 6. It is also possible to obtain such frequency characteristics by other means, that stress a specific range, in place of the trap circuit. It is therefore obvious that the effect of the present invention can likewise be obtained so long as the overall frequency characteristics are such as those shown in FIG. 6.

What is claimed is:

1. A recording apparatus suitable for a magnetic recording/reproduction apparatus for recording and audio signal and a video signal as superimposed signals on the same recording track, said recording apparatus comprising:
   means for recording the audio signal in the form of a frequency-modulated signal on a recording tape by means of a first recording head; and
   means for recording video signal information by means of a second recording head on the recording track formed by said first recording head, said video signal information consisting of a frequency-modulated luminance signal and a carrier color signal frequency-converted to a frequency band lower than the frequency band of said frequency-modulated luminance signal, including means for causing the frequency characteristics of the recording current of said frequency-modulated luminance signal to be substantially constant between the carrier frequency corresponding to the sync leading edge portion and the carrier frequency corresponding to the white peak in said frequency-modulated luminance signal.

2. A recording apparatus according to claim 1 wherein said means for causing the frequency characteristics of the recording current to be substantially constant consists of a trap circuit disposed in the path of said frequency-modulated luminance signal, said trap circuit having a trap frequency close to the carrier frequency corresponding to the leading edge of the sync signal.

3. A recording apparatus according to claim 1 wherein said means for causing the frequency characteristics of the recording current to be substantially constant consists of a trap circuit disposed between the output of a modulation circuit for frequency-modulating the carrier wave with a luminance signal and addition means for adding said carrier color signal converted to a low frequency band to said frequency-modulated signal modulated by said luminance signal, said trap circuit having a trap frequency close to the carrier frequency corresponding to the leading edge of the sync signal.

4. A recording apparatus according to claim 3 wherein said first magnetic head consists of a first rotary magnetic head for helical scanning, and said second magnetic head consists of a second rotary magnetic head for helical scanning, said first rotary magnetic head being positioned for tracing the same recording track as said first rotary magnetic head.

* * * * *